United States Patent [19]
Tanaka

[11] Patent Number: 5,473,682
[45] Date of Patent: Dec. 5, 1995

[54] AUTOMATIC SIGNALLING-SYSTEM SWITCHING DEVICE FOR DIGITAL LINE CIRCUIT DEVICE IN SUBSCRIBER SYSTEM

[75] Inventor: Kazuo Tanaka, Kawasaki, Japan

[73] Assignee: Fujitsu Limited, Kanagawa, Japan

[21] Appl. No.: 410,406

[22] Filed: Mar. 27, 1995

Related U.S. Application Data

[63] Continuation of Ser. No. 16,874, Feb. 11, 1993, abandoned.

[30] Foreign Application Priority Data

Feb. 12, 1992 [JP] Japan ................................. 4-025090

[51] Int. Cl.$^6$ .................................................. H04M 3/22
[52] U.S. Cl. ........................... 379/372; 379/377; 379/399
[58] Field of Search ................................. 379/372, 373, 379/377, 386, 399, 402; 375/38, 40; 370/110.1, 68.1

[56] References Cited

U.S. PATENT DOCUMENTS

| | | | |
|---|---|---|---|
| 4,383,316 | 5/1983 | Seidel | 375/38 |
| 4,484,036 | 11/1984 | Lyle et al. | 379/373 |
| 4,622,680 | 11/1986 | Zinser | 375/38 |
| 4,641,318 | 2/1987 | Addeo | 375/40 |
| 4,961,185 | 10/1990 | Sawada | 370/110.1 |
| 4,998,273 | 5/1991 | Nichols | 379/373 |
| 5,034,978 | 7/1991 | Nguyen et al. | 379/402 |
| 5,133,006 | 7/1992 | Khuat | 379/399 |
| 5,142,528 | 8/1992 | Kobayashi et al. | 370/110.1 |
| 5,231,649 | 7/1993 | Duncanson | 375/38 |
| 5,253,289 | 10/1993 | Tanaka | 379/372 |

FOREIGN PATENT DOCUMENTS

| | | | |
|---|---|---|---|
| 2753420 | 6/1979 | Germany | 375/38 |
| 0012507 | 1/1979 | Japan | 379/372 |
| 55-37075 | 3/1980 | Japan . | |
| 0192993 | 8/1991 | Japan | 379/372 |

Primary Examiner—Jeffery A. Hofsass
Assistant Examiner—Scott Wolinsky

[57] ABSTRACT

In an automatic signaling-system switching device provided in a subscriber line circuit between a communications device and an exchange, the subscriber line circuit has a plurality of signaling-system processing units respectively providing processes suitable for a plurality of signaling systems usable in the subscriber line circuit. A first unit is provided for identifying one of the plurality of signaling systems on the basis of a state of the subscriber line circuit. The signaling systems have respective particular states of the subscriber line circuit. A second unit is provided, which selects one of the plurality of signaling system processing units corresponding to the one of the plurality of signaling systems identified by the first unit.

17 Claims, 6 Drawing Sheets

FIG. IA PRIOR ART
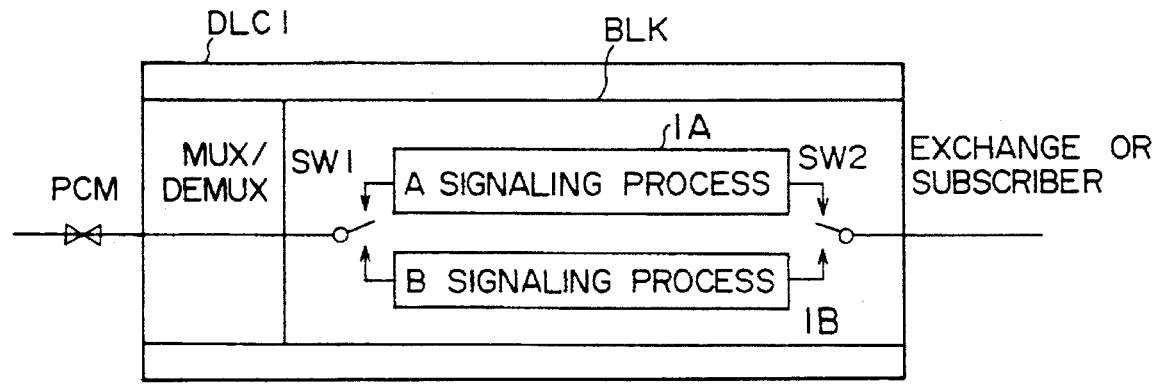
FIG. IB PRIOR ART
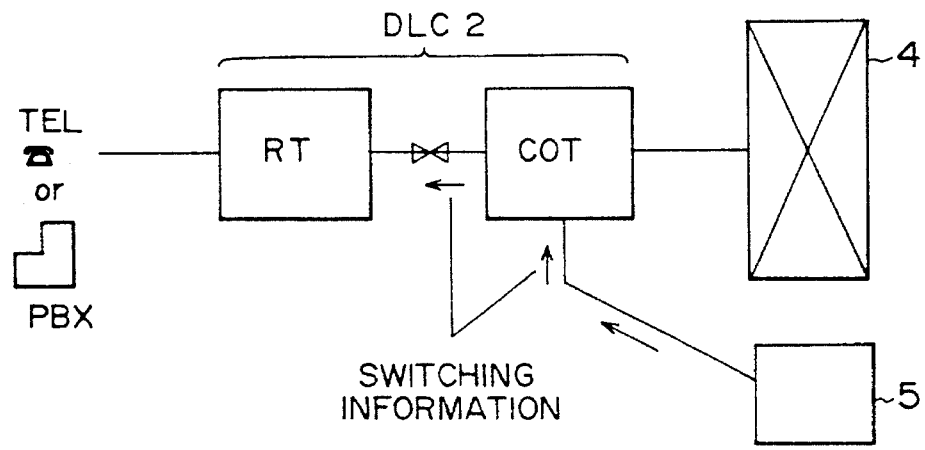

AUTOMATIC SIGNALLING-SYSTEM SWITCHING DEVICE FOR DIGITAL LINE CIRCUIT DEVICE IN SUBSCRIBER SYSTEM

This is a continuation of application Ser. No. 08/016,874, filed Feb. 11, 1993, now abandoned.

BACKGROUND OF THE INVENTION

1. Field of the Invention

The present invention generally relates to a digital line circuit device provided in a subscriber system of a communications system, and more particularly to a signaling-system switching device for selecting one of signaling systems of the digital line circuit device so that a signaling process can be selected which is suitable for the signaling system of a subscriber line circuit extending between a subscriber terminal and an exchange via the digital line circuit device.

2. Description of the Prior Art

FIG. 1A shows a first conventional digital line circuit device DLC1 provided in a subscriber system between a subscriber terminal and an exchange that are connected to each other via a subscriber line circuit. The digital line circuit device DLC1 includes a signal processing block BLK and a multiplexer/demultiplexer MUX/DMUX. The signal processing block BLK includes a first signaling system circuit 1A, and a second signaling system circuit 1B. The first signaling system circuit 1A executes a first signaling process suitable for a first signaling system (an A signaling system) of the subscriber line circuit. The second signaling system circuit 1B executes a second signaling process suitable for a second signaling system (a B signaling system) of the subscriber line circuit. In accordance with the actual signaling system of the subscriber line circuit, either the first signaling system circuit 1A or the second signaling system circuit 1B is selected and connected to the subscriber line circuit by means of a pair of manual switches SW1 and SW2. PCM (Pulse Code Modulated) data is transferred via the subscriber line circuit.

FIG. 1B shows a second digital line circuit device DLC2, which comprises a remote terminal RT and a central office terminal COT. The remote terminal RT is provided at the subscriber side, and is connected to a subscriber terminal, such as a telephone set TEL or a private branch exchange PBX. The central office terminal COT is provided at the side of an exchange 4, and is connected thereto.. The digital line circuit device DLC2 also includes the first and second signaling system circuits (not shown) as shown in FIG. 1A.

Switching between the first and second signaling system circuits is automatically carried out under control of a system controller 5, such as a personal computer. The system controller 5 sends the central office terminal COT switching information indicating the signaling system circuit to be selected from among the first and second signaling system circuits. The switching information is transferred to the remote terminal RT via the subscriber line circuit.

The first digital line circuit device DLC1 shown in FIG. 1A has a disadvantage in that either the first signaling system circuit or the second signaling system circuit must be manually selected by a service provider before services for the subscriber line circuit can be started.

The second digital line circuit device DLC2 shown in FIG. 1B has a disadvantage in that use of the system controller 5 increases the cost for building the communications system and requires additional space in the central office.

SUMMARY OF THE INVENTION

It is a general object of the present invention to provide an automatic signaling-system switching device in which the above disadvantages are eliminated.

A more specific object of the present invention is to provide a simple, less-expensive automatic signaling-system switching device.

The above objects of the present invention are achieved by an automatic signaling-system switching device provided in a subscriber line circuit between a communications device and an exchange, the subscriber line circuits having a plurality of signaling system processing units respectively providing processes suitable for a plurality of signaling systems usable in the subscriber line circuit, the automatic signaling system switching device comprising: first means for identifying one of the plurality of signaling systems on the basis of a state of the subscriber line circuit, the signaling systems respectively having particular states of different types of subscriber line circuits; and second means, coupled to the first means, for selecting one of the plurality of signaling system processing units corresponding to the one of the plurality of signaling systems identified by the first means.

Another object of the present invention is to provide a digital line circuit device using the above-mentioned automatic signaling-system switching device.

This object of the present invention is achieved by a digital line circuit device between a communications device and an exchange, the digital line circuit device comprising: a plurality of signaling-system processing units respectively providing processes suitable for a plurality of signaling systems usable in the subscriber line circuit; and an automatic signaling-system switching device including: first means for identifying one of the plurality of signaling systems on the basis of a state of the subscriber line circuit, the signaling systems respectively having particular states of different types of subscriber line circuit; and second means, coupled to the first means, for selecting one of the plurality of signaling-system processing units corresponding to the one of the plurality of signaling systems identified by the first means.

The above object of the present invention is also achieved by a digital line circuit device comprising: a central office terminal connected to an exchange via a subscriber line; a remote terminal connected to the communications device; and a transmission line connecting the central office terminal and the remote terminal to each other. The central office terminal comprises: a plurality of signaling-system processing units respectively providing processes suitable for a plurality of signaling systems usable in the subscriber line circuit; and an automatic signaling-system switching device including: first means for identifying one of the plurality of signaling systems on the basis of a state of the subscriber line circuit, the signaling systems having particular states of different types of subscriber line circuits; and second means, coupled to the first means, for selecting one of the plurality of signaling-system processing units corresponding to the one of the plurality of signaling systems identified by the first means.

BRIEF DESCRIPTION OF THE DRAWINGS

Other objects, features and advantages of the present invention will become more apparent from the following detailed description when read in conjunction with the accompanying drawings, in which:

FIG. 1A is a block diagram of a first conventional digital line circuit;

FIG. 1B is a block diagram of a second conventional digital line circuit;

DESCRIPTION OF THE PREFERRED EMBODIMENT

Figure 2:
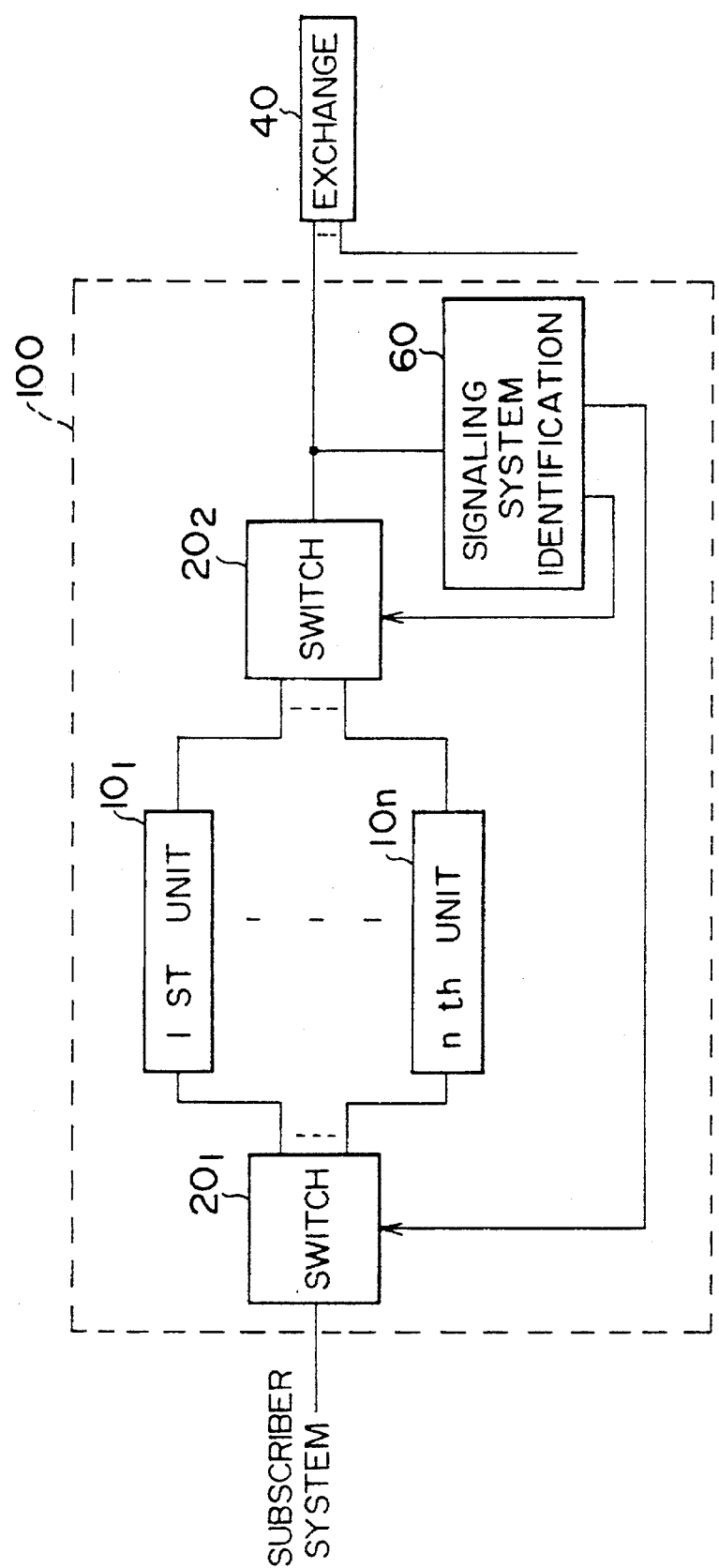
FIG. 2 is a block diagram of an overview of an automatic signaling-system switching device of the present invention.

FIG. 2 shows an overview of an automatic signaling-system switching device 100 of the present invention. The automatic signaling-system switching device 100 comprises a plurality of signaling-system processing units $10_1$–$10_n$, where n is an integer. A switching unit $20_1$ connects a subscriber line circuit connected to a subscriber terminal to one of the first through nth signaling-system processing units $10_1$–$10_n$. A switching unit 202 connects one of the first through nth signaling-system processing units $10_1$–$10_n$ to an exchange 40 via the subscriber line circuit.

A signaling-system identification unit 60, which is connected to the subscriber line circuit at the exchange 40 side, monitors the state of the line circuit extending from the exchange 40. The line circuit has specific states based on respective signaling systems. Examples of the signaling systems are a loop-start signaling system and a ground-start signaling system, both of which will be described later.

The signaling-system identification unit 60 identifies the signaling system to be employed for the subscriber line circuit on the basis of the state of the subscriber line circuit. Then, the signaling-system identification unit 60 sends signaling-system setting signals to the respective switching units $20_1$ and $20_2$. In this manner, the signaling-system processing unit matching the signaling system of the subscriber line circuit is selected by means of the switching units $20_1$ and $20_2$.

A description will now be given of the loop-start signaling system and the ground-start signaling system.

Figure 3A:
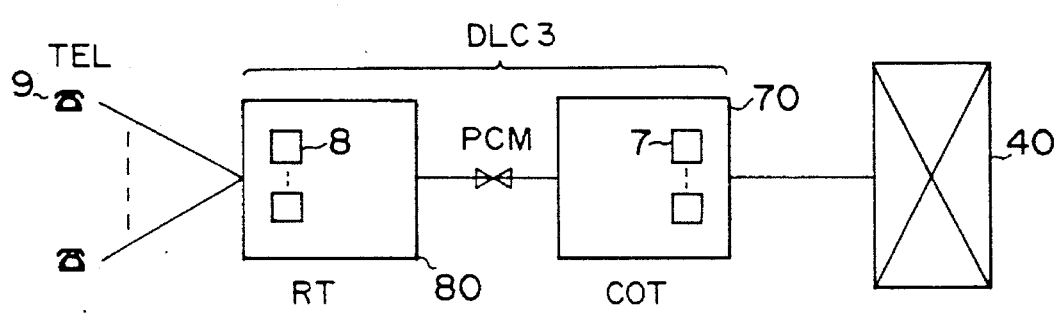
FIG. 3A is a block diagram illustrating a loop-start signaling system.

FIG. 3A is a diagram for explaining the loop-start signaling system. A digital line circuit device DLC3 includes a central office unit (COT) 70 and a remote terminal (RT) 80 connected to each other via a PCM line. The central office unit 70 includes a plurality of units 7 provided for the respective subscriber line circuits, and the remote terminal 80 includes a plurality of units 8 provided for the respective subscriber line circuits. A set of units 7 and 8 corresponds to the configuration shown in FIG. 2.

The loop-start signaling system is used for normal telephone sets TEL connected to the remote terminal 80. According to the loop-start signaling system, each subscriber line circuit is supplied with power from the exchange 40 when each subscriber line circuit is idle. More particularly, the subscriber line circuit connected to the exchange 40 includes a tip line and a ring line. The tip line is grounded, and the ring line is connected to a power source, such as a battery. When the subscriber line circuit is idle, the subscriber line circuit is in the closed state, and hence the power supply voltage is supplied via the tip line and the ring line.

Figure 3B:
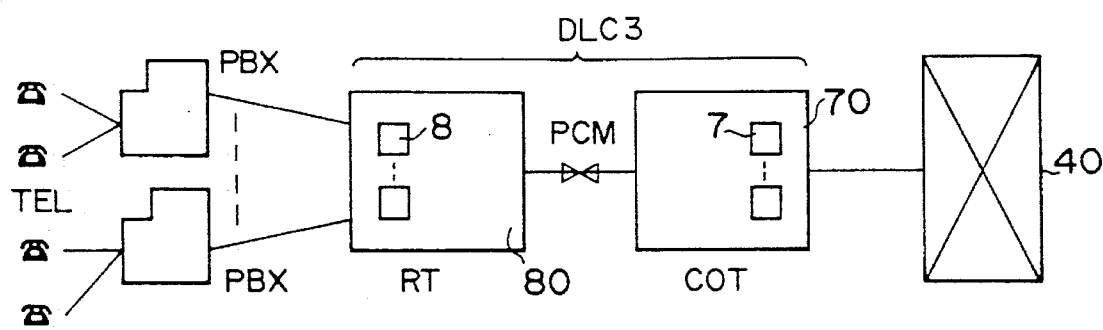
FIG. 3B is a block diagram illustrating a ground-start signaling system.

FIG. 3B is a diagram for explaining the ground-start signaling system. The ground-start signaling system is used for private branch exchanges PBX connected to the remote terminal 80. The telephone sets TEL are connected to the private branch exchanges PBX. When the subscriber line circuit is idle, there is no power supply from the exchange 40. More particularly, the ring line is set at a predetermined power supply voltage –48 V, for example), while the tip line is in the open state. That is, the subscriber line is maintained in the open state, and no power is fed via the subscriber line circuit.

Figure 4:
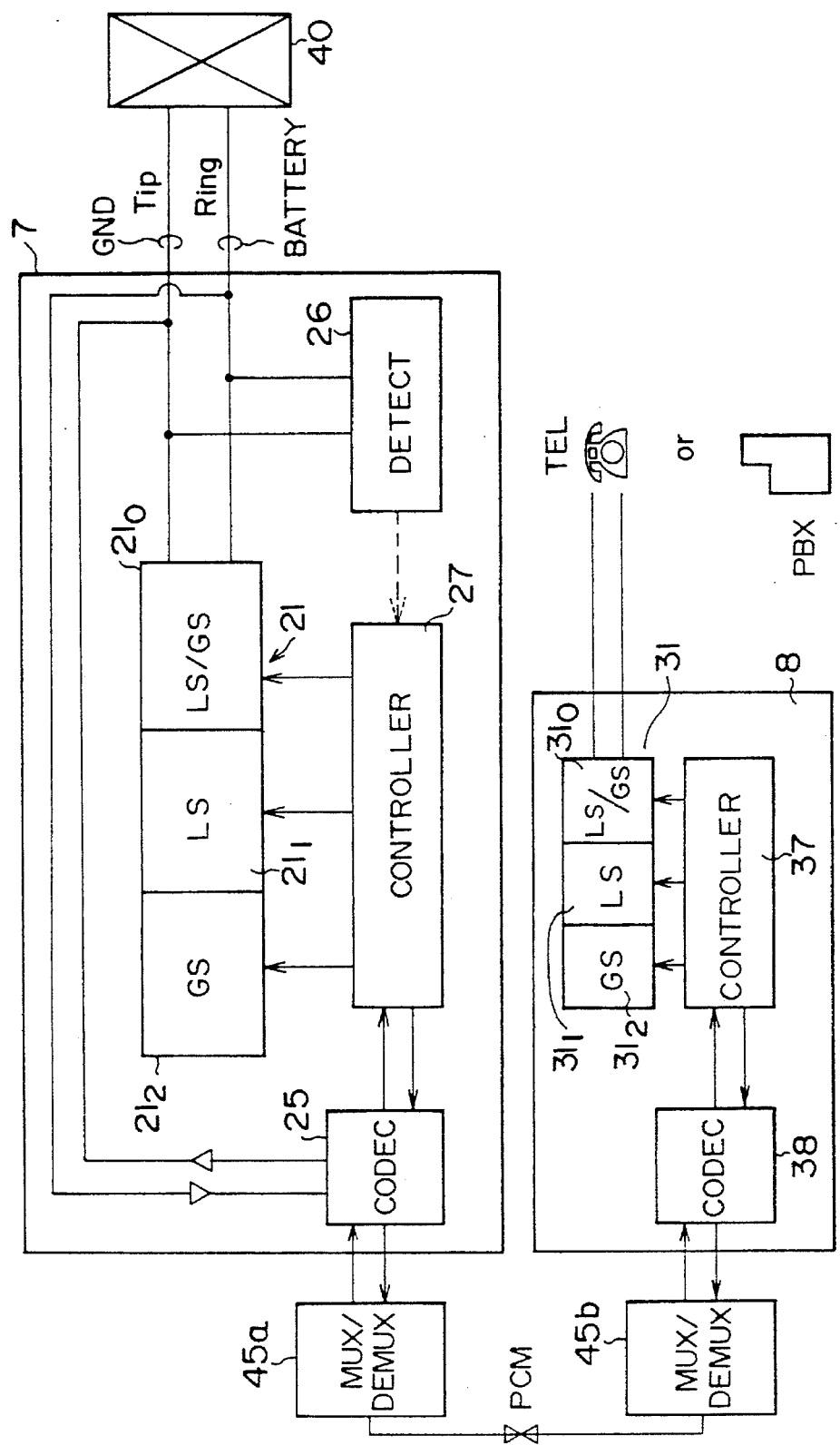
FIG. 4 is a block diagram of a part of the system structure shown in FIGS. 3A and 3B.

FIG. 4 illustrates the structure of the digital line circuit device DLC3 shown in FIGS. 3A and 3B in relation to one subscriber line circuit. The digital line circuit device DLC3 includes the unit 7, the unit 8, and two multiplexer/demultiplexers 45a and 45b. The other units 7 (not shown in FIG. 4) are connected to the multiplexer/demultiplexer 45a, and the other units 8 (not shown in FIG. 4) are connected to the multiplexer/demultiplexer 45b. Each of the units 7 is formed in a package, which is inserted into a shelf of the central office terminal 70 of the digital line circuit device DLC3. Similarly, each of the units 8 is formed in a package, which is inserted into a shelf of the remote terminal 80 of the digital line circuit device DLC3.

The unit 7 provided in the central office terminal 70 includes a signaling-system processing unit 21, a coder/decoder (codec) 25, a power supply voltage detection unit 26, and a controller 27. The signaling-system processing unit 21, which can be formed with a general-purpose microprocessing unit, includes a loop-start (LS) signaling-system processing unit $21_1$, a ground-start (GS) signal system processing unit $21_2$, and an LS/GS common processing unit $21_0$.

The LS signaling-system processing unit $21_1$ executes a signaling process of the LS signaling system for the telephone sets TEL. The GS signaling system processing unit $21_2$ executes a signaling process of the GS signaling system for the private branch exchanges PBX. These signaling processes themselves are known, and a detailed description thereof will be omitted here. The LS/GS common unit $21_0$ executes a signaling process in common to the LS and GS signaling systems. The processor 27 controls the signaling-system processing unit 21, and the codec 25. Further, the processor 27 selects either the LS signaling-system processing unit $21_1$ or the GS signaling-system processing unit $21_2$ in accordance with a signaling-system setting signal from the power supply voltage detection unit 26. The codec 25 codes an analog speech signal from the exchange 40 into a digital speech signal, and decodes a digital speech signal from the multiplexer/demultiplexer 45a into an analog signal. The digital speech signal consists of eight bits, one of the eight bits being used to transfer one-bit switching data indicating the signaling system to be used in the subscriber line circuit.

The power supply voltage detection unit 26 is connected to the tip line and the ring line. The power supply voltage detection unit 26 determines whether or not a predetermined power supply voltage is developed across the tip line and the ring line. When the subscriber line circuit is based on the loop-start signaling system, the predetermined power supply voltage is developed across the tip line and ring line. When the subscriber line circuit is based on the ground-start signaling system, there is no voltage between the tip line and the ring line. The power supply voltage detection circuit 26 sends the controller 27 the signaling-system setting signal indicating the result of the above detection.

The multiplexer/demultiplexer 45a multiplexes the digital speech signals from the units 7 to generate a PCM signal, and demultiplexes a PCM signal from the multiplexer/demultiplexer 45b to generate digital speech signals to be applied to the units 7. The multiplexer/demultiplexer 45b has the same function as the multiplexer/demultiplexer 45a.

The remote terminal 8 is configured in the same manner as the central office terminal 7. More particularly, the unit 8 includes a signaling-system processing unit 31, a processor 37 and a codec 38. The LS signaling-system processing unit $31_1$ executes the signaling process of the LS signaling system for the telephone sets TEL. The GS signaling-system processing unit $31_2$ executes the signaling process of the GS signaling system for the private branch exchanges PBX. The LS/GS common unit $31_0$ executes the signaling process in common to the LS and GS signaling systems. The processor 37 controls the signaling-system processing unit 31, and the codec 38. Further, the processor 37 selects either the LS signaling-system processing unit $31_1$ or the GS signaling-system processing unit $31_2$ in accordance with the one-bit switching data from the unit 7. The codec 35 codes an analog speech signal from the telephone set TEL or the PBX into a digital speech signal, and decodes a digital speech signal from the multiplexer/demultiplexer 45b into an analog signal. The subscriber line circuits from the unit 8 are connected to the telephone set TEL or the private branch exchange PBX.

A description will now be given of the operation of the digital subscriber circuit unit DLC3 according to the present invention. As will be described below, either the LS signaling-system processing unit $21_1$ or the GS signaling system processing unit $21_2$ is automatically selected when the package of the unit 7 is inserted into a desired slot in the shelf of the digital line circuit device DLC3.

Figure 5:
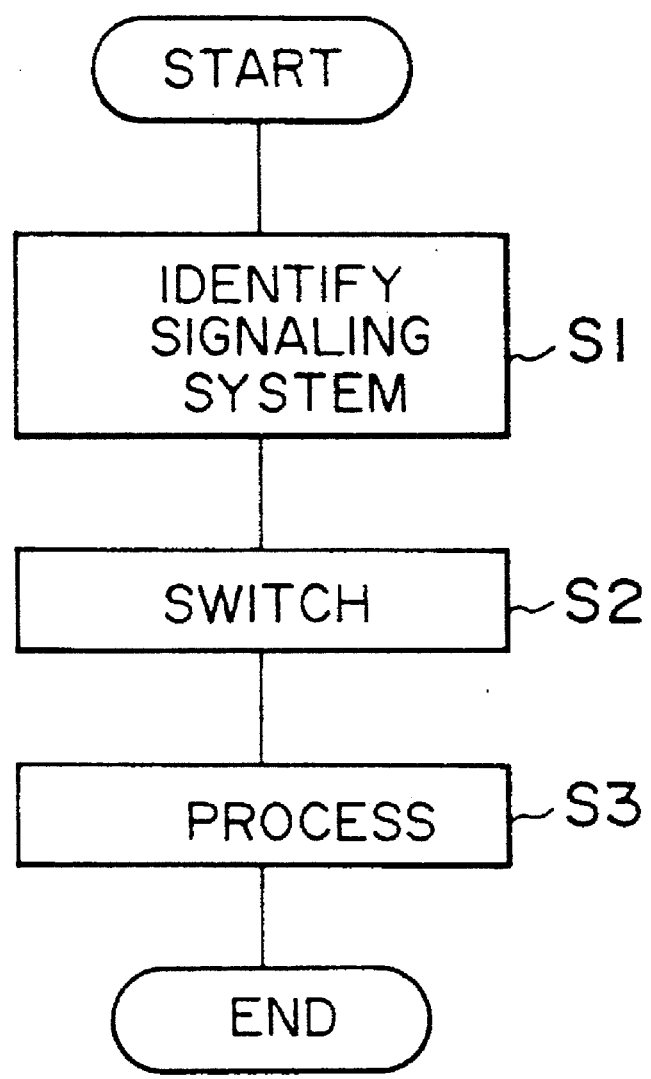
FIG. 5 is a flowchart showing the operation of the structure shown in FIG. 4.

When the package of the unit 7 is inserted into a desired slot in the shelf of the digital line circuit device DLC3, the unit 7 is connected to the tip line and to the ring line of the subscriber line circuit extending from the exchange 40. When the subscriber line circuit employs the loop-start signaling system, the power supply voltage is obtained across the tip line and the ring line. The power supply voltage detection unit 26 detects the power supply voltage, and sends the processor 27 the signaling-system setting signal having a value or level indicating that the subscriber line circuit is based on the loop-start signaling system (step S1 shown in FIG. 5). The processor 27 selects the LS signaling-system processing unit $21_1$ (step S2). Hence, the unit 7 is allowed to execute the signaling process for the loop-start signaling system (step S3). Further, the processor 27 sends the codec 25 switching information indicating that the subscriber line circuit is based on the loop-start signaling system. The codec 25 inserts one-bit switching data into eight-bit speech data to be sent to the remote terminal 8.

The multiplexer/demultiplexer 45a executes a multiplexing operation on pieces of speech data from the units 7, and sends PCM data to the multiplexer/demultiplexer 45b. The multiplexer/demultiplexer 45b executes a demultiplexing operation on the PCM data and sends pieces of speech data to the units 8.

The codec 38 of the remote unit 8 connected to the subscriber line circuit being considered receives the speech data from the unit 7 shown in FIG. 4, and sends decoded speech signal to the controller 37. The controller 37 reads the one-bit switching data and determines which signaling-system processing unit should be selected. In the example being considered, the one-bit switching data indicates the LS signaling system. Hence, the controller 37 selects the LS signaling-system processing unit $31_1$.

The digital line circuit device DLC3 will operate in the same manner as described above when the power supply voltage detection unit 26 does not detect the power supply voltage between the tip and ring lines.

In the above operation, the LS/GS common units $21_0$ and $31_0$ are always selected irrespective of whether the subscriber line circuit is based on the LS signaling system or on the GS signaling system.

Figure 6:
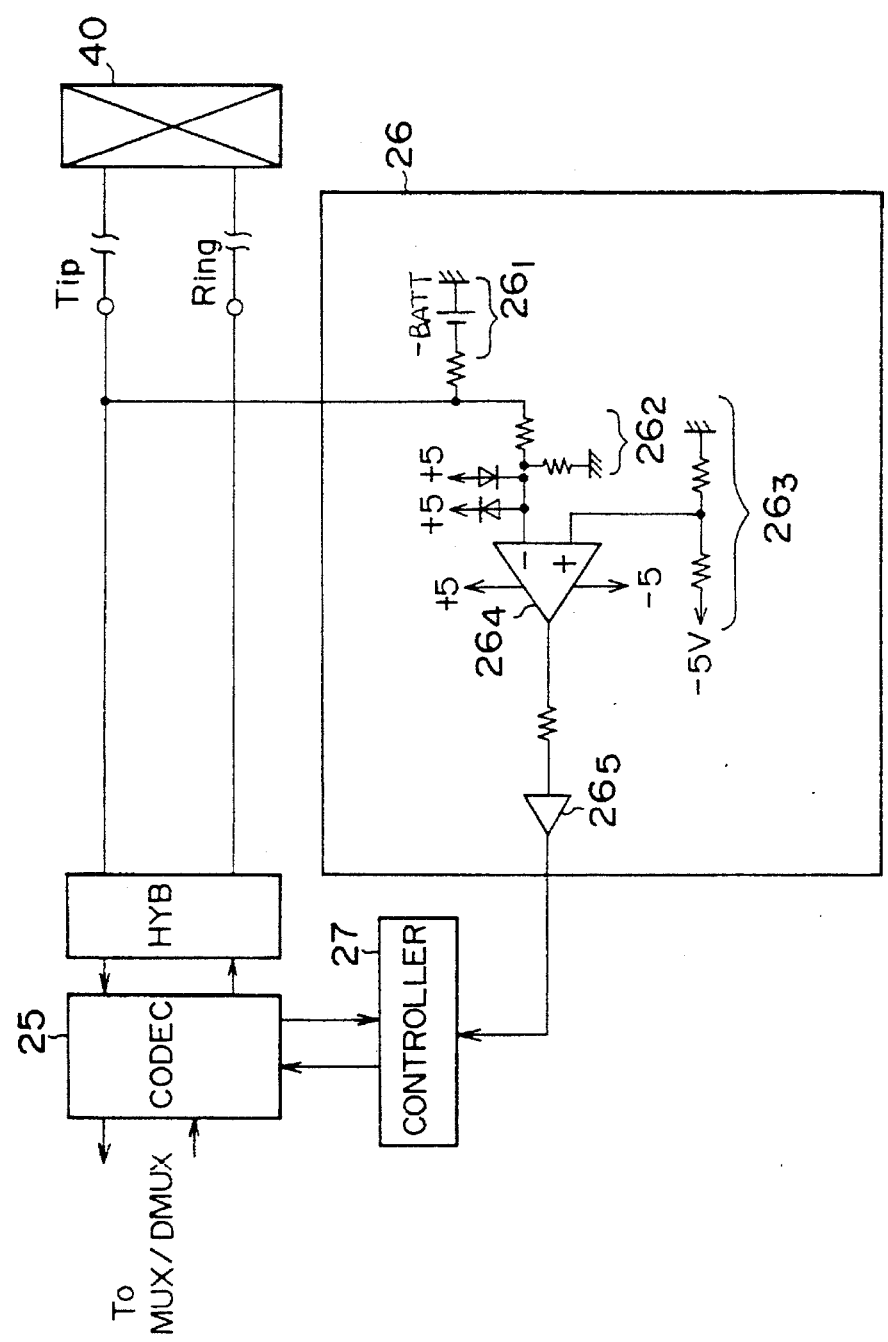
FIG. 6 is a block diagram of a power supply voltage detection unit shown in FIG. 4.

FIG. 6 is a circuit diagram of the power supply voltage detection unit 26 shown in FIG. 4. The power supply voltage detection unit 26 is made up of a battery $26_1$, a first resistor network $26_2$, a second resistor network $26_3$, an operational amplifier $26_4$, and a buffer $26_5$. The battery $26_1$ generates a predetermined battery voltage −BATT (−48 V in Japan) is provided specifically for monitoring the potential of the tip line. The resistor first network $26_2$ functions to apply a divided voltage to the inverting input terminal of the operational amplifier $26_4$. The inverting input terminal of the operational amplifier $26_4$ is connected to a voltage line set at +5 V via a first diode, and is connected to a voltage line set at −5 V via a second diode. The operational amplifier $26_4$ receives power supply voltages of +5 V and −5 V. The tip and ring lines are connected to a hybrid circuit HYB providing an interface between two wires and four wires.

The second resistor network $26_3$, connected between the ground and the −5 V voltage line, generates a negative threshold voltage for determining whether the subscriber line circuit is based on the LS signaling system or on the GS signaling system. When the subscriber line circuit is based on the LS signaling system, the tip line is set at the ground potential. In this case, the potential applied to the inverting input terminal of the operational amplifier $26_4$ is higher than the threshold voltage. The output signal of the operational amplifier $26_4$ obtained at this time passes through a resistor and the buffer $26_5$, and is applied to the controller 27. When the subscriber line circuit is based on the GS signaling system, the tip line is maintained in the open state. Hence, current passes through the first resistor network $26_2$. In this case, the potential applied to the inverting input terminal of the operational amplifier $26_4$ is lower than the threshold voltage. The output signal of the operational amplifier $26_4$ is applied to the controller 27 via the resistor and the buffer 26.

The signaling system of the present invention is not limited to the loop-start and ground-start signaling systems. The communications terminals coupled to the line circuit device are not limited to the telephone sets The present invention is not limited to the specifically disclosed embodiment, and variations and modifications may be made without departing from the scope of the present invention.

What is claimed is:

1. An automatic signaling-system switching device provided in a subscriber line circuit connected between a communications device and an exchange, the subscriber line circuit including a plurality of signaling-system processing units, each signaling-system processing unit corresponding to and configured for processing signals of a respective one of a plurality of signaling systems usable in the subscriber line circuit, said automatic signaling-system switching device comprising:

identifying means for identifying which one of the plurality of signaling systems is to be used in the subscriber line circuit on the basis of a state of the subscriber line circuit, and issuing signaling-system setting signals on the basis of said state, the signaling systems having respective particular states of the subscriber line circuit; and selecting means, coupled to said identifying means, for receiving said signaling-system setting signals and selecting from the plurality of signaling-system processing units a signaling-system processing unit corresponding to the signaling system identified by said identifying means.

2. The automatic signaling-system switching device as claimed in claim 1, wherein said identifying means comprises means for detecting a voltage between a tip line and a ring line of the subscriber line circuit and for identifying one of the plurality of signaling systems on the basis of said voltage.

3. The automatic signaling-system switching device as claimed in claim 1, wherein said identifying means comprises means for detecting a potential of a tip line of the subscriber line circuit and for identifying one of the plurality of signaling systems on the basis of said detected potential.

4. The automatic signaling-system switching device as claimed in claim 3, wherein said means for detecting a potential comprises means for comparing said potential with a threshold potential and for identifying one of the plurality of signaling systems on the basis of a said comparison.

5. The automatic signaling-system switching device as claimed in claim 1, wherein said identifying means comprises means for detecting the state of the subscriber line circuit.

6. A digital line circuit device between a communications device and an exchange, said digital line circuit device comprising:

a plurality of signaling-system processing units respectively providing processes suitable for a plurality of signaling systems usable in a subscriber line circuit; and an automatic signaling-system switching device including:

identifying means for identifying which one of the plurality of signaling systems is to be used in the subscriber line circuit on the basis of a state of the subscriber line circuit, the signaling systems respectively having particular states of different types of subscriber line circuits, said identifying means issuing signaling-system setting signals on the basis of said state; and selecting means, coupled to said identifying means, for receiving said signaling-system setting signals and selecting from the plurality of signaling-system processing units a signaling-system processing unit corresponding to the signaling system identified by said identifying means.

7. The digital line circuit device as claimed in claim 6, wherein said indentifying means comprises means for detecting a voltage between a tip line and a ring line of the subscriber line circuit and for identifying one of the plurality of signaling systems on the basis of said voltage.

8. The digital line circuit device as claimed in claim 6, wherein said indentifying means comprises means for detecting a potential of a tip line of the subscriber line circuit and for identifying one of the plurality of signaling systems on the basis of said detected potential.

9. The digital line circuit device as claimed in claim 8, wherein said means for detecting a potential comprises means for comparing said potential with a threshold potential and for identifying one of the plurality of signaling systems on the basis of said comparison.

10. The digital line circuit device as claimed in claim 6, wherein said indentifying means comprises means for detecting the state of the subscriber line circuit.

11. The digital line circuit device as claimed in claim 6, wherein said communications device comprises a telephone set.

12. The digital line circuit device as claimed in claim 6, wherein said communications device comprises a private branch exchange.

13. A digital line circuit device comprising:

a central office terminal connected to an exchange via a subscriber line;

a remote terminal connected to a communication device; and a transmission line connecting the central office terminal and the remote terminal to each other, wherein said central office terminal comprises:

a plurality of signaling-system processing units respectively providing processes suitable for a plurality of signaling systems usable in a subscriber line circuit; and an automatic signaling-system switching device including:

identifying means for identifying which one of the plurality of signaling systems is to be used in the subscriber line circuit on the basis of a state of the subscriber line circuit, the signaling systems respectively having particular states of different types of subscriber line circuits, said identifying means issuing signaling-system setting signals on the basis of said state; and selecting means, coupled to said identifying means, for receiving said signaling-system setting signals and selecting from the plurality of signaling-system processing units a signaling system processing unit corresponding to the signaling system identified by said first identifying means.

14. The digital line circuit device as claimed in claim 13, wherein said remote terminal comprises:

a plurality of additional signaling-system processing units also respectively providing processes suitable for the plurality of signaling systems usable in the subscriber line circuit; and additional selecting means for selecting one of the plurality of signaling-system processing units in the remote terminal so that the remote terminal and the central office terminal use an identical process suitable for the subscriber line circuit.

15. The digital line circuit device as claimed in claim 14, further comprising transferring means for transferring, via said transmission line, information indicating said one of the plurality of signaling systems from said central office terminal to said remote terminal.

16. A digital line circuit device comprising:

a central office terminal connected to an exchange via a subscriber line;

a remote terminal connected to a communication device; and a transmission line connecting the central office terminal and the remote terminal to each other,
wherein said central office terminal comprises:
- a plurality of first signaling-system processing units respectively providing processes suitable for a plurality of signaling systems usable in the subscriber line circuit; and
- an automatic signaling-system switching device including:
  - first means for identifying one of the plurality of signaling systems on the basis of a state of the subscriber line circuit, the signaling systems respectively having particular states of different types of subscriber line circuits; and
  - second means, coupled to said first means, for selecting one of the plurality of signaling-system processing units corresponding to said one of the plurality of signaling systems identified by said first means, wherein said remote terminal comprises:
- a plurality of second signaling-system processing units respectively providing processes suitable for the plurality of signaling systems usable in the subscriber line circuit; and
- third means for selecting one of the plurality of signaling-system processing units in the remote terminal so that the remote terminal and the central office terminal use an identical process suitable for the subscriber line circuit.

17. The digital line circuit device as claimed in claim 16, further comprising fourth means for transferring, via said transmission line, information indicating said one of the plurality of signaling systems from said central office terminal to said remote terminal.

* * * * *